US008376341B2

(12) United States Patent
Kocher

(10) Patent No.: US 8,376,341 B2
(45) Date of Patent: Feb. 19, 2013

(54) SUPPORT DEVICE

(76) Inventor: Wendell E. Kocher, Phillipsburg, NJ (US)

(*) Notice: Subject to any disclaimer, the term of this patent is extended or adjusted under 35 U.S.C. 154(b) by 679 days.

(21) Appl. No.: 12/433,242

(22) Filed: Apr. 30, 2009

(65) Prior Publication Data

US 2009/0272602 A1 Nov. 5, 2009

Related U.S. Application Data

(60) Provisional application No. 61/126,178, filed on May 1, 2008.

(51) Int. Cl.

| | |
|---|---|
| ***B25B 1/20*** | (2006.01) |
| ***B25B 1/22*** | (2006.01) |
| ***B23Q 3/02*** | (2006.01) |
| ***E04G 1/00*** | (2006.01) |
| ***E04G 3/00*** | (2006.01) |
| ***E04G 25/00*** | (2006.01) |
| ***E06C 5/32*** | (2006.01) |
| ***A47F 5/00*** | (2006.01) |
| ***F16M 13/00*** | (2006.01) |
| *E06C 7/00* | (2006.01) |

(52) U.S. Cl. ................ 269/95; 269/39; 269/45; 269/76; 182/129; 248/351

(58) Field of Classification Search .................... 269/95, 269/41, 71, 69, 91, 45, 39, 76; 182/129, 182/172, 103; 248/237, 149, 124.2, 351
See application file for complete search history.

(56) References Cited

U.S. PATENT DOCUMENTS

| | | | | |
|---|---|---|---|---|
| 2,273,813 | A * | 2/1942 | Barber | 248/124.2 |
| 2,887,974 | A | 5/1959 | Weinfeld | |
| 3,131,928 | A * | 5/1964 | Whipple | 269/224 |
| 3,490,558 | A * | 1/1970 | Foley | 182/103 |
| 4,058,302 | A * | 11/1977 | Barrowcliff | 269/76 |
| 4,070,011 | A | 1/1978 | Glesser | |
| 4,418,793 | A * | 12/1983 | Brent | 182/129 |
| 4,428,571 | A * | 1/1984 | Sugarman | 5/648 |
| 4,560,031 | A * | 12/1985 | Dixon et al. | 182/129 |
| 5,082,037 | A * | 1/1992 | Hammons et al. | 144/286.5 |
| 5,544,718 | A * | 8/1996 | Schumacher | 182/129 |
| 5,647,567 | A * | 7/1997 | Pugh et al. | 248/237 |
| 5,660,637 | A * | 8/1997 | Dodge | 118/500 |
| 5,740,883 | A * | 4/1998 | Trank | 182/129 |
| 5,890,739 | A * | 4/1999 | Cogswell, Sr. | 280/769 |
| 5,953,802 | A * | 9/1999 | Radzio | 29/239 |
| 6,367,788 | B1 * | 4/2002 | Babchuk | 269/45 |
| 6,520,495 | B1 | 2/2003 | La Mendola | |
| 6,543,733 | B1 * | 4/2003 | Pennington | 248/149 |
| 6,672,577 | B2 | 1/2004 | Murvine | |
| 6,889,968 | B1 * | 5/2005 | Wong | 269/91 |
| D518,348 | S | 4/2006 | Fahey | |
| 7,063,311 | B1 * | 6/2006 | Ascolese | 269/69 |
| 7,232,119 | B2 * | 6/2007 | Yonenoi | 269/71 |

(Continued)

*Primary Examiner* — Lee D Wilson
*Assistant Examiner* — Alvin Grant
(74) *Attorney, Agent, or Firm* — James Ray & Assoc

(57) ABSTRACT

A support device for use with at least one of a stepladder, an extension ladder, and scaffolding, includes a base member manufactured from a first predetermined material and having a first predetermined shape and a first predetermined size. A height adjustable rod member is operably connected at a first end thereof to such base member. A brace member has a first end and a second end, such first end of such brace member being perpendicularly engaged with such elongated rod member. A securing mechanism is operably disposed on such second end of such brace member for securing such brace member to such at least one of such stepladder, such extension ladder, and such scaffolding,. At least one support member is releasably engageable with such second end of such rod member for supporting a predetermined object thereon.

20 Claims, 6 Drawing Sheets

U.S. PATENT DOCUMENTS 7,255,198 B1 * 8/2007 Lo ................................ 182/172
7,374,158 B2 * 5/2008 Deming .......................... 269/41
7,377,048 B2 * 5/2008 Koetter .......................... 33/613
7,603,817 B2 * 10/2009 Lewis .......................... 52/127.2
2009/0229918 A1 * 9/2009 Moss et al. .................... 182/129

* cited by examiner

SUPPORT DEVICE

CROSS REFERENCE TO RELATED APPLICATION

This patent application is related to and claims priority from U.S. Provisional Patent Application Ser. No. 61/126,178 filed May 1, 2008.

FIELD OF THE INVENTION

The present invention relates, in general, to a support device for temporarily supporting an object in a particular position so such object may be permanently affixed in such position and, more particularly, this invention relates to a portable adjustable support device which can be used in conjunction with at least one of a stepladder, an extension ladder, and scaffolding to support a predetermined object in a predetermined position such that such predetermined object may be affixed in such position.

BACKGROUND OF THE INVENTION

Prior to the conception and development of the present invention, support devices, such as stepladders, ladders, and scaffolding, as is generally well known in the prior art, have been used to support people.

Specifically of interest to the present invention are the following: Fahey, U.S. Design Pat. No. D 518,348 discloses the ornamental design for an adjustable clamping device.

Weinfeld, U.S. Pat. No. 2,887,974, discloses a multiple portable support means for holding circuitry parts which are to be soldered or otherwise bound together.

Glesser, U.S. Pat. No. 4,070,011, discloses a tool or jig for holding a workpiece which includes a base having at least four arms joined at a common center and radiating outwardly at 90 degree angles to each other. The free end of each arm includes a clip for releasably holding the workpiece.

Mendola, U.S. Pat. No. 6,520,495, discloses an apparatus for clamping an object which includes a clamp having a resilient element to maintain the clamp in closed position in the absence of applied pressure, and a release mechanism. An arm with a cable encased by a plurality of tubular, cone shaped segments is attached to the release mechanism, which is in turn attached to the clamp and includes either coil springs or bow springs for maintaining tension in the cable when the clamp is in a closed position, and for releasing tension in the cable when the clamp is opened.

Murvine, U.S. Pat. No. 6,672,577, discloses a hobbyist's tool comprised of a grid-like base member containing a plurality of uniformly shaped and uniformly spaced apart peg openings into which adjustable, flexible arms may be attached.

SUMMARY OF THE INVENTION

The present invention provides a support device for use with at least one of a stepladder, an extension ladder, and scaffolding. Such support device includes a base member manufactured from a first predetermined material and having a first predetermined shape and a first predetermined size. A height adjustable rod member is operably connected at a first end thereof to such base member. A brace member has a first end and a second end, such first end of such brace member being perpendicularly engaged with such elongated rod member. A securing mechanism is operably disposed on such second end of such brace member for securing such brace member to such at least one of such stepladder, such extension ladder, and such scaffolding. At least one support member is releasably engageable with such second end of such rod member for supporting a predetermined object thereon.

OBJECTS OF THE INVENTION

It is, therefore, one of the primary objects of the present invention to provide a support device for use with at least one of a stepladder, an extension ladder, and scaffolding, such support device being connectable to such at least one of such stepladder, such extension ladder, and such scaffolding and being for use in supporting an object such that a user of the device can attach such object to a structure.

Another object of the present invention is to provide a support device for use in supporting a predetermined object such as a picture, a painting, a gutter, tubing, a pipe, crown molding, sheet rock, a drapery rod, and the like such that such predetermined object is positioned so that a user may at least one of work on such predetermined object, attach such predetermined object to a predetermined structure, support such predetermined object as it is being removed from and/or installed to a predetermined structure and the like.

Still another object of the present invention is to provide a device for use in supporting objects such that a user of such device need not seek help from friends, family, neighbors, coworkers, and the like to complete a predetermined task such as hanging drapery rods, sheet rock, paneling, pictures, photos, gutters, pipes, tubing, crown molding, etc.

Yet another object of the present invention is to provide a device for use by tradesmen, home re-modelers, plumbers, technicians, construction workers, homeowners, carpenters, mechanics, and the like which can be used to make a two person job, such as hanging a predetermined object, into a one person job by eliminating the need for a second person to support a predetermined object while such predetermined object is installed and/or removed by a first person.

An additional object of the present invention is to provide a device which is releasably connectable to at least one of a stepladder, an extension ladder, and scaffolding and which can be used to support predetermined objects.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
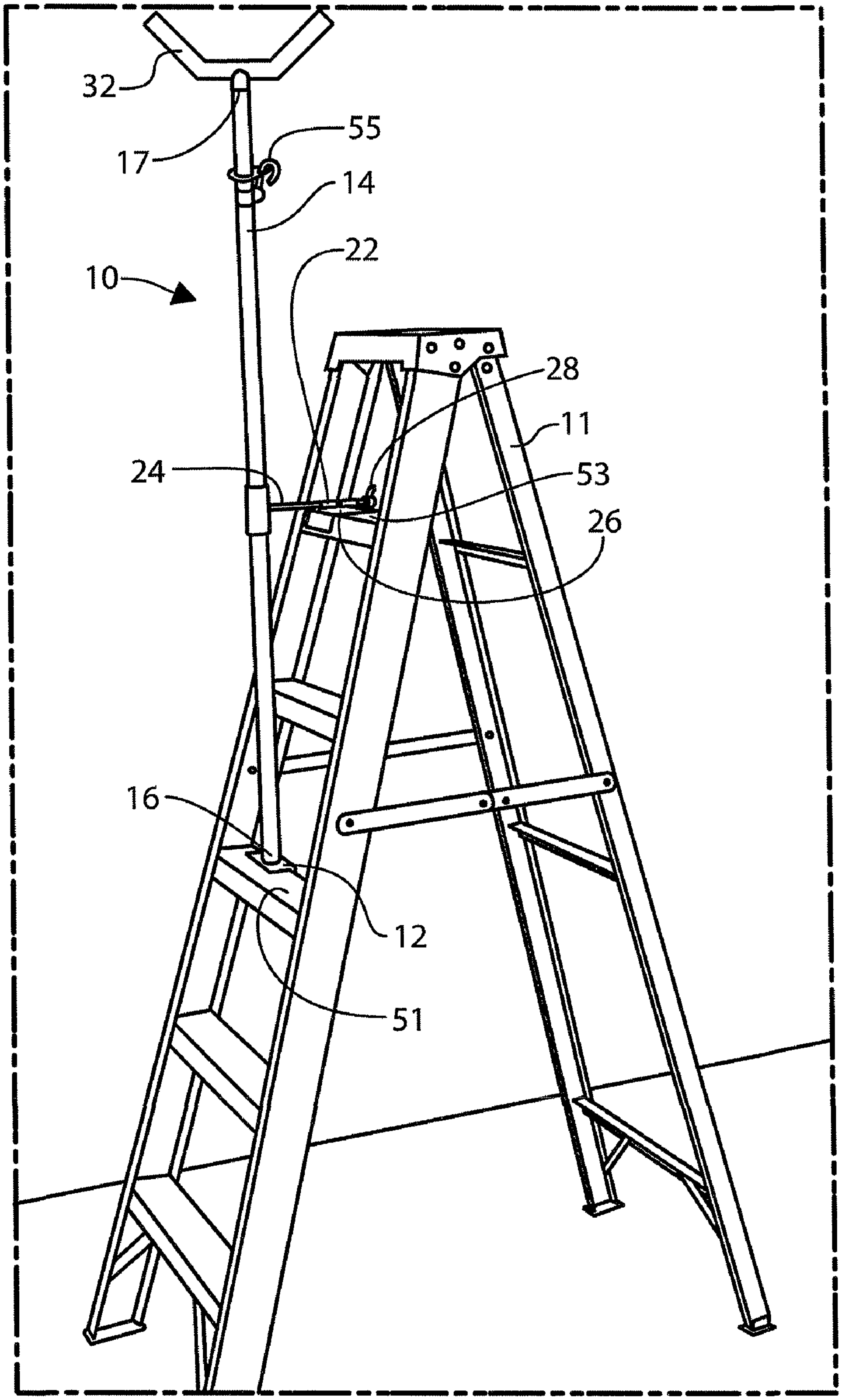
FIG. 1 is a partial perspective view of the invention according to one embodiment of the invention in which the invention is shown attached to a stepladder.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-6.

A support device, generally designated 10, for use with at least one of a stepladder 11, an extension ladder 13, and scaffolding 15, is provided. It is presently preferred that such at least one of such stepladder, such extension ladder, and such scaffolding is a stepladder 11.

Such support device 10 includes a base member 12 manufactured from a first predetermined material and having a first predetermined shape and a first predetermined size. It is presently preferred that such first predetermined shape is substantially L-shaped. According to another embodiment such first predetermined shape is substantially rectangular.

Figure 2:
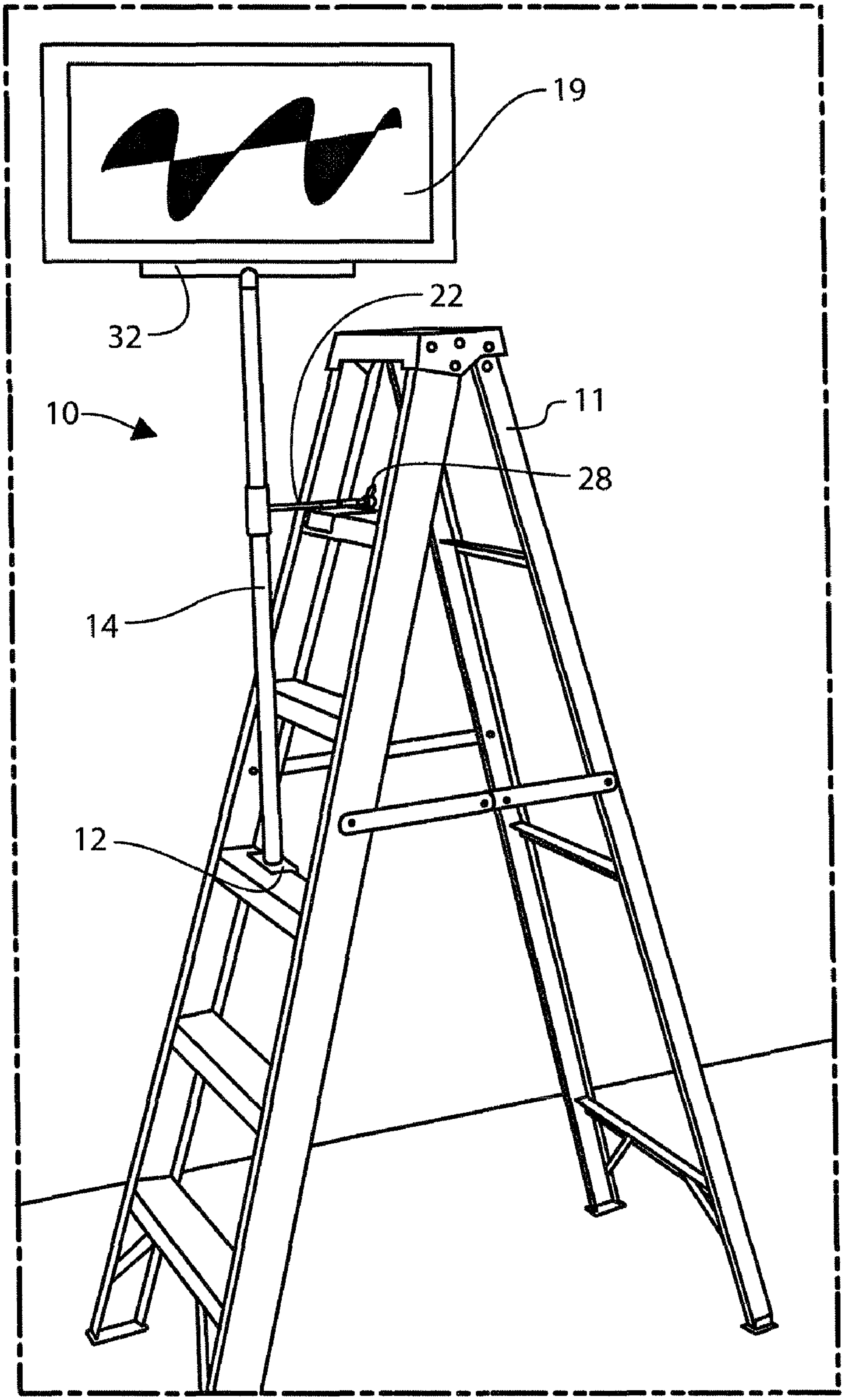
FIG. 2 is a partial perspective view of the invention according to one embodiment of the invention.
Figure 3:
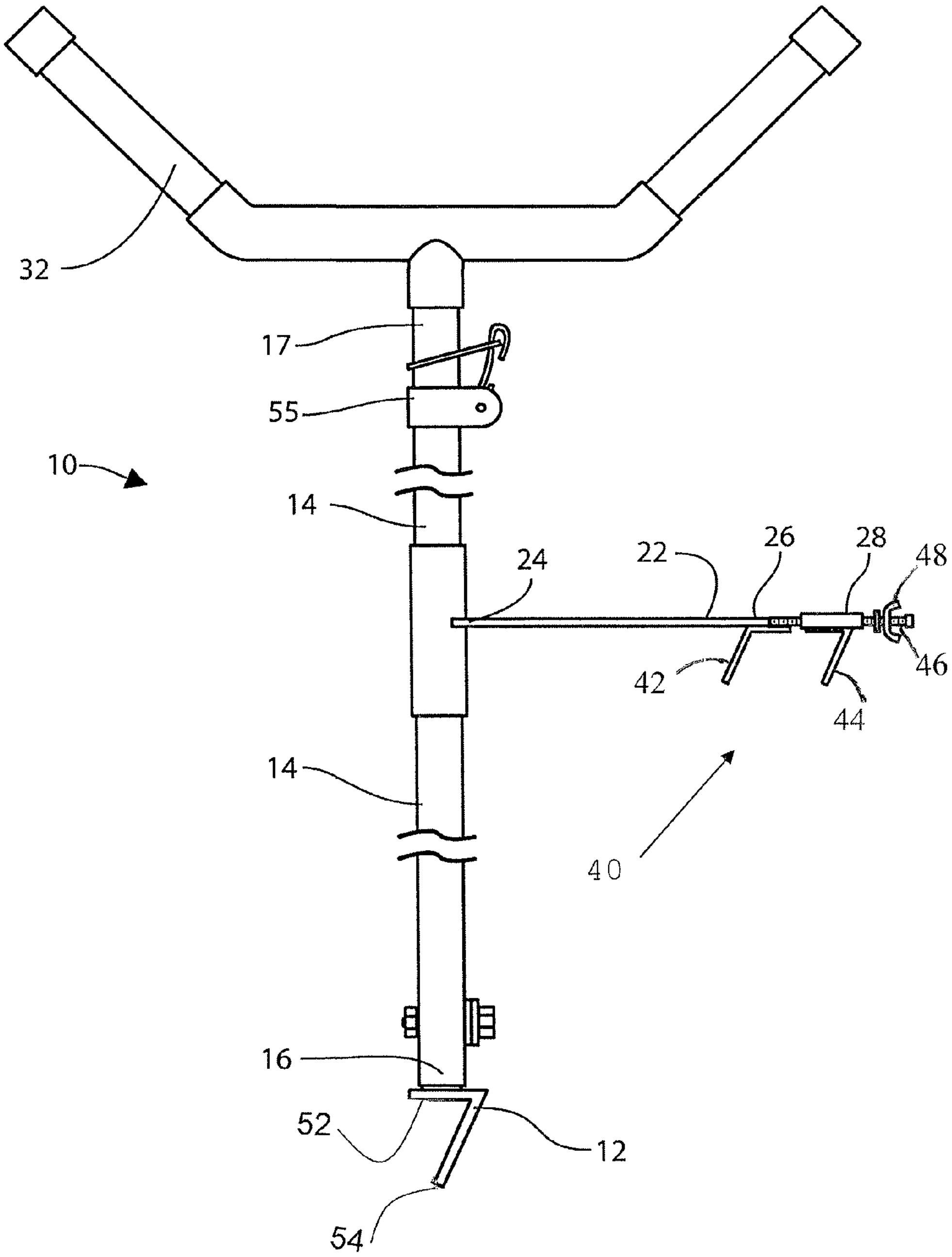
FIG. 3 is a partial perspective view of the invention according to one embodiment of the invention.
Figure 4:
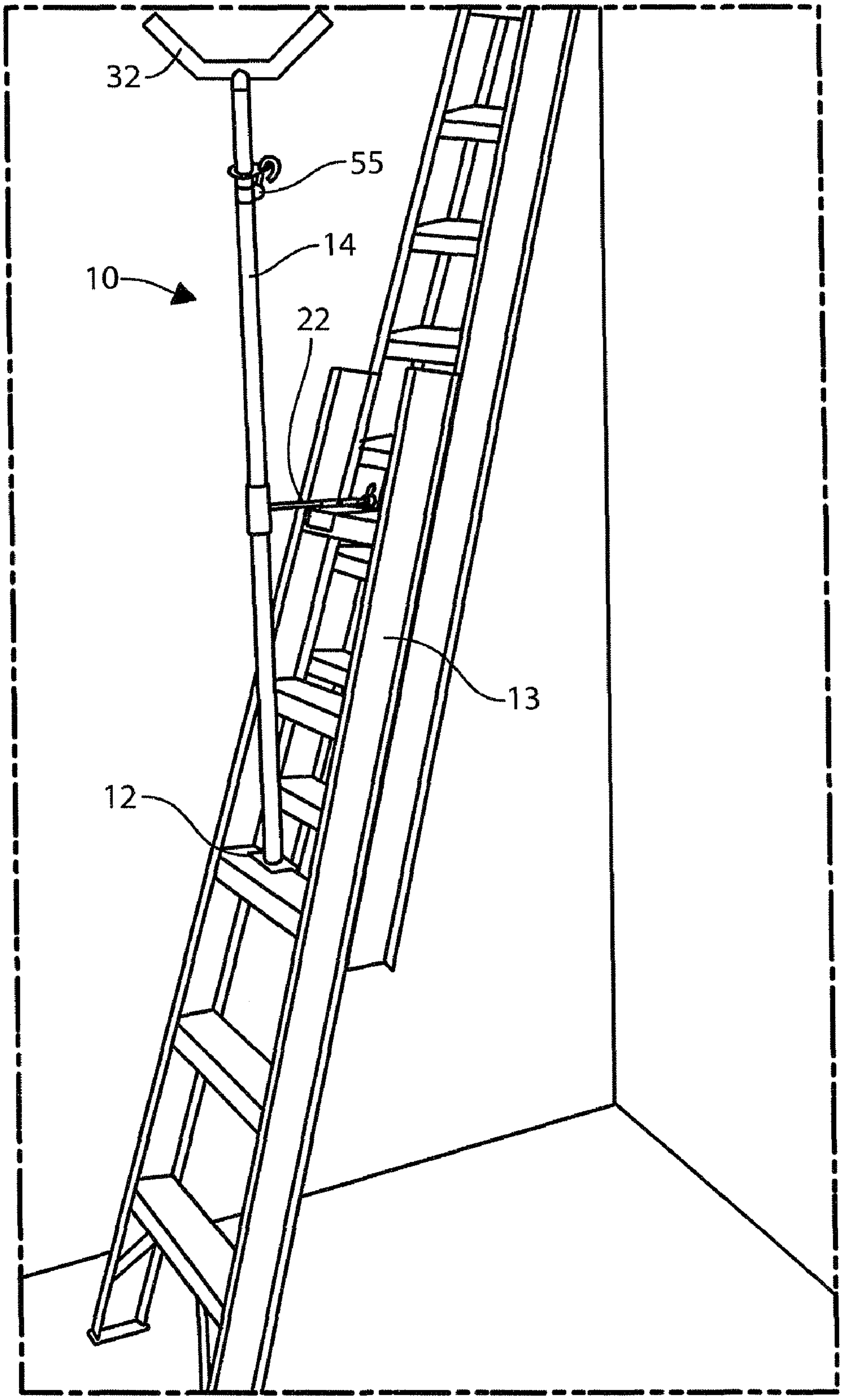
FIG. 4 is a partial perspective view of the invention according to one embodiment of the invention in which the invention is shown attached to an extension ladder.
Figure 5:
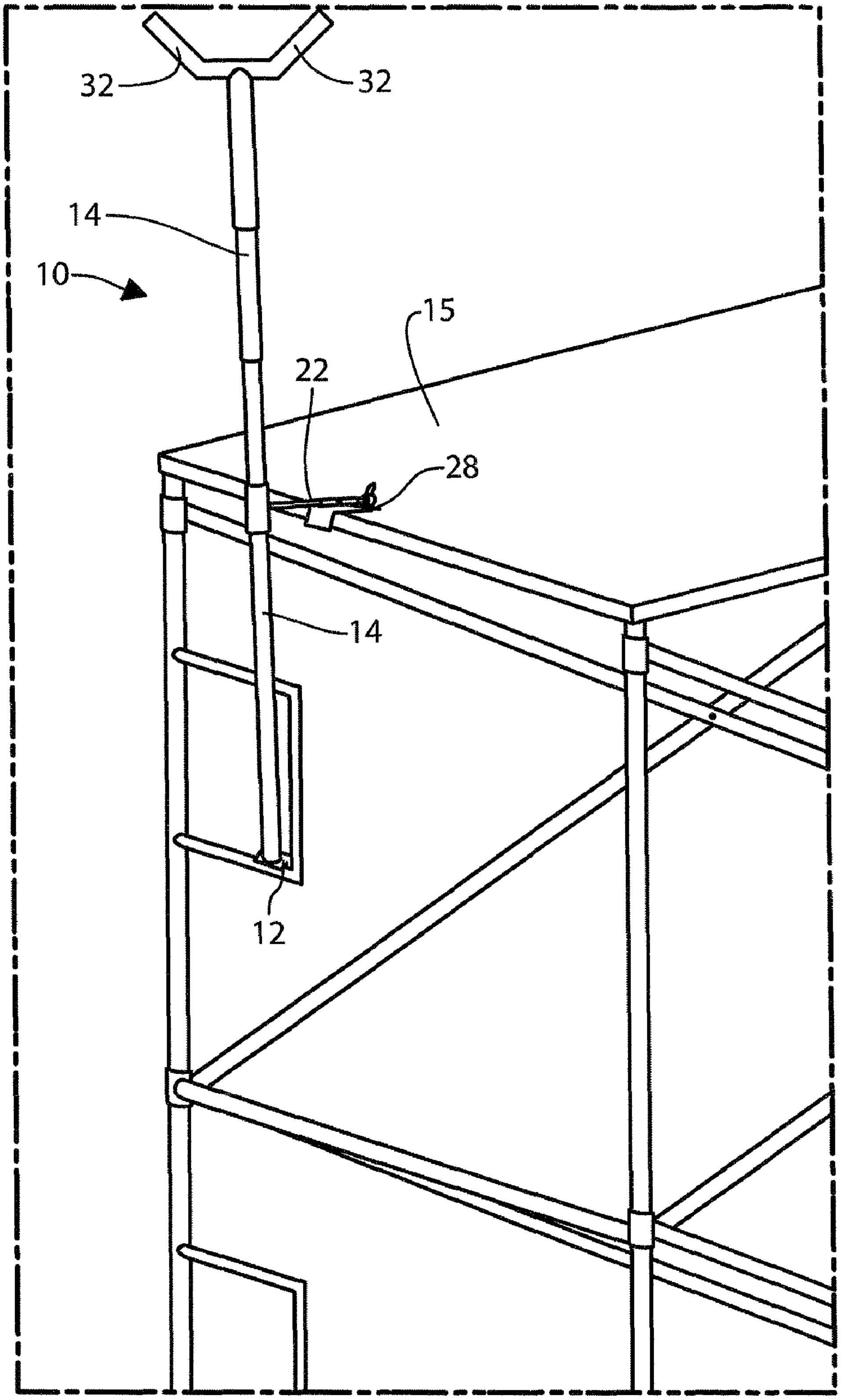
FIG. 5 is a partial perspective view of the invention according to one embodiment of the invention in which the invention is shown attached to scaffolding.

A height adjustable rod member 14 is operably connected at a first end 16 thereof to such base member 12. It is presently preferred that such first end 16 of such height adjustable rod member 14 is perpendicularly disposed on a first portion 52 of such base member 12, and that said first portion is connected at one edge to a second portion 54 such that an acute angle is formed between the two portions while still being substantially L-shaped. In use, this first portion directly abuts the top surface of a step of a ladder as illustrated in FIGS. 1, 2, and 4.

It is presently preferred that such height adjustable rod member 14 is telescoping. According to one embodiment, as shown in FIG. 1, a friction clamp means 55 may be used to adjust the height of such rod member 14. According to another embodiment such height adjustable rod 14 is telescoping via a friction fit means. However, the device is not meant to be limited as such and any type of telescoping means may be used to facilitate such a purpose.

An elongated brace member 22 has a first end 24 and a second end 26, such first end 24 of such brace member 22 being perpendicularly engaged with such height adjustable rod member 14. It is presently preferred that a first end 24 of such brace member 22 is perpendicularly disposed on such height adjustable rod member 14. A jaw-like securing means 40 includes a fixed first jaw portion 42 and a second portion 44, which is attached to piece 28, which is reciprocally movable on such second end 26 of such brace member 22, with an adjustable retaining nut 48 on an externally threaded end 46, for securing such brace member 22 to a predetermined portion of such at least one of such stepladder 11, such extension ladder 13, and such scaffolding 15. It is presently preferred that such securing means 28 is a clamp type securing means.

At least one support member 32 is releasably engageable with a second end 17 of such height adjustable rod member 14 for supporting a predetermined object 19 thereon. It is presently preferred that such at least one support member 32 is perpendicularly engageable with such second end 17 of such height adjustable rod member 14.

Figure 6:
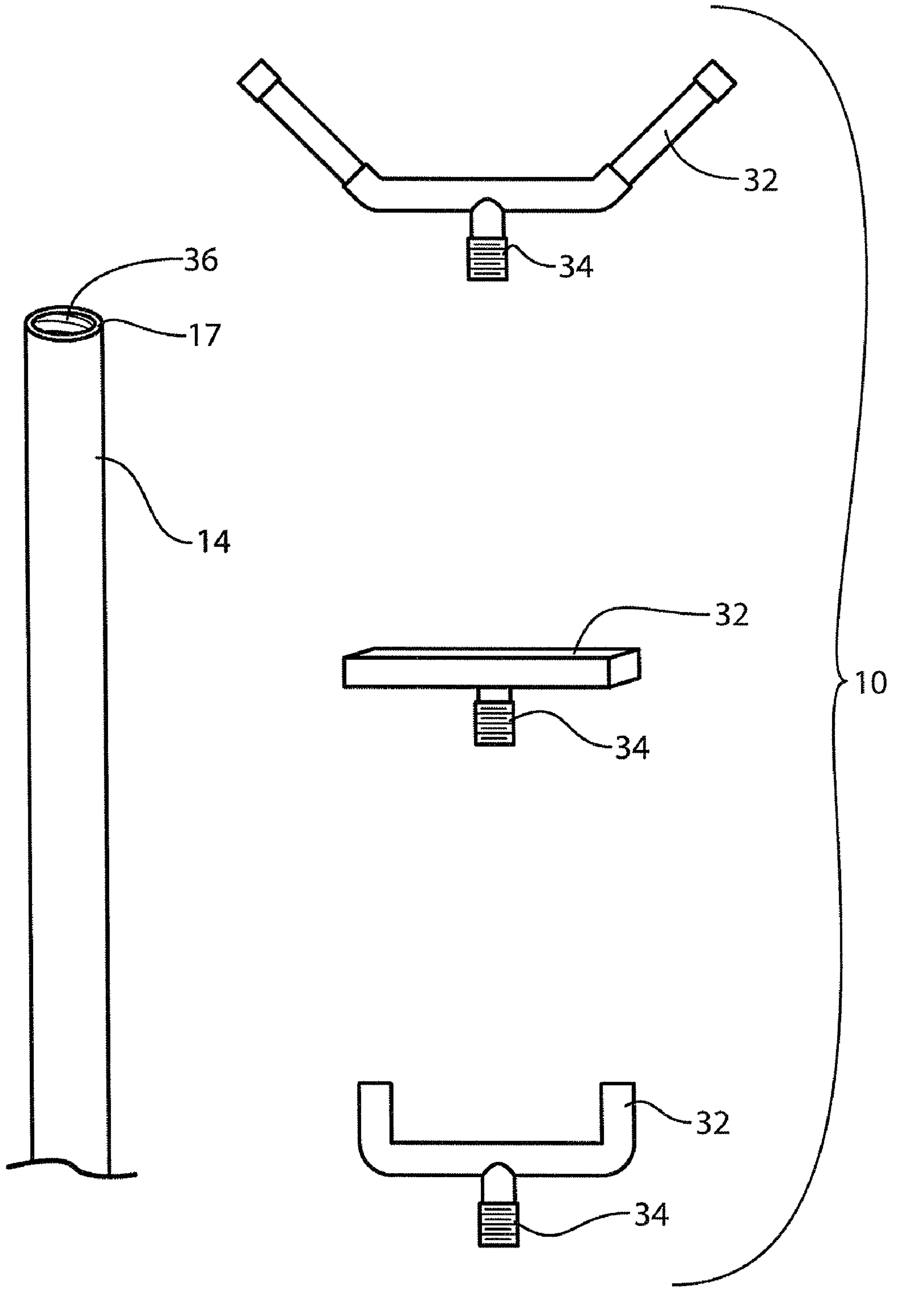
FIG. 6 is a partial perspective view of the invention according to one embodiment of the invention in which a plurality of support members are engageable with the height adjustable rod member.

It is presently preferred that such at least one support member 32 includes at least one of a male member 34 and a female member 36 and such second end 17 of such height adjustable rod member 14 is formed as an opposite one of such male member 34 and such female member 36; such male member 34 and such female member 36 being releasably engageable with each other. Preferably, at least one of such male member 34, such female member 36, and a combination thereof are threaded as illustrated in FIG. 6. According to another embodiment such male member 34 is secured within such female member 36 via at least one of friction fit means, pressure fit means, and a combination thereof.

It is presently preferred that a top surface of such at least one support member 32 is one of substantially flat and generally unshaped. It is presently preferred that such device 10 includes a plurality of support members 32 having a plurality of shapes and a plurality of sizes as illustrated in FIG. 6. According to one embodiment, such at least one support member 32 is a plurality of generally unshaped members.

It is presently preferred that at least one of such height adjustable rod 14, such at least one support member 32, such base member 12, and a combination thereof is rotatable.

It is further presently preferred that such support device 10 is at least one of disassembleable, collapsible, and a combination thereof.

It is meant that a user (not shown) rest such base member 12 on a portion of such at least one of such stepladder 11, such extension ladder 13, and such scaffolding 15. For example, as seen in FIG. 1 such base member 12 may rest on a first predetermined step 51 of such stepladder 11. The first securing means 28 engages the brace member 22 with such at least one of such stepladder, such extension ladder, and such scaffolding. As shown in FIG. 1 such first securing means 28 is shown attached to a second predetermined step 53 of such stepladder 11. The height adjustable rod member 14 may then be extended and retracted to a desired height and the predetermined object supported on the support member 32, as shown in FIG. 2, while such user completes a predetermined task relating to the predetermined object. Advantageously, a plurality of support members may be releasably engageable with such height adjustable rod member 14 such that such user may choose which specific one of such plurality of support members to attach to the height adjustable rod and best serve his or her needs.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A support device for use with at least one of a stepladder, an extension ladder, and scaffolding, such support device comprising:

a. a base member size having a generally L shape, wherein a surface of a first portion of said base member directly abuts a portion of the at least one of a stepladder, an extension ladder, and scaffolding during use of said support device;

b. a height adjustable rod member connected at a first end thereof to said base member;

c. an elongated brace member having a first end and a second end, said first end being perpendicularly engaged with said height adjustable rod member;

d. a securing means operably disposed on said second end of said brace member for securing said elongated brace member to a predetermined portion of such at least one of a stepladder, an extension ladder, and scaffolding; and e. at least one support member releasably engageable with said second end of said height adjustable rod member for supporting a predetermined object thereon.

2. A support device according to claim 1 wherein said securing means is a clamp type securing means.

3. A support device according to claim 1 wherein said first predetermined shape is substantially rectangular.

4. A support device according to claim 1 wherein said first end of said height adjustable rod member is perpendicularly disposed on said base member.

5. A support device according to claim 1 wherein said support said at least one support member is a plurality of support members having a plurality of shapes and a plurality of sizes.

6. A support device according to claim 1 wherein said at least one support member is perpendicularly engageable with said second end of said height adjustable rod member.

7. A support device according to claim 1 wherein a top surface of said at least one support member is one of substantially flat and generally u-shaped.

8. A support device according to claim 7 wherein said at least one support member is a plurality of generally u-shaped members.

9. A support device according to claim 1 wherein at least one of said height adjustable rod member, said at least one support member, said base member, and a combination thereof is rotatable.

10. A support device according to claim 1 wherein said support device is at least one of disassembleable, collapsible, and a combination thereof.

11. A support device according to claim 1 wherein said height adjustable rod member is telescoping.

12. A support device according to claim 11 wherein said height adjustable rod member is telescoping via a friction fit means.

13. A support device according to claim 1 wherein said at least one support member includes at least one of a male member and a female member and said second end of said elongated rod member is formed as an opposite one of said male member and said female member, said male member and said female member being releasably engageable with each other.

14. A support device according to claim 1, wherein said at least one support member includes at least one of a male member and a female member and wherein at least one of said male member, said female member, and a combination thereof are threaded.

15. A support device according to claim 1, wherein said at least one support member includes at least one of a male member and a female member and wherein said male member is secured within said female member via at least one of friction fit means, pressure fit means, and a combination thereof.

16. A support device according to claim 1 wherein such at least one of such at least one of such stepladder, such extension ladder, and such scaffolding is a stepladder.

17. A support device according to claim 1 wherein said first predetermined shape is substantially L-shaped.

18. A support device for use with a stepladder, such support device comprising:

a. a base member manufactured from a first predetermined material and having a first predetermined shape and a first predetermined size;

b. a height adjustable rod member operably connected at a first end thereof to said base member;

c. an elongated brace member having a first end and a second end, said first end being perpendicularly engaged with said elongated rod member;

d. a clamp member disposed on said second end of said brace member, said clamp member including:

(i) a portion of said second end of said brace member having an external thread;

(ii) a first jaw portion secured on said second end of said brace member and extending at an angle therefrom;

(iii) a second jaw portion, reciprocally movable on said externally threaded portion toward to and away from said first jaw, said second jaw extending at said second angle generally parallel to said first jaw; and (iv) a member threadably mounted on said externally threaded portion and reciprocally movable thereon; and e. at least one support member releasably engageable with said second end of said rod member for supporting a predetermined object thereon.

19. The support device of claim 1, wherein said securing means includes:

(a) a portion of said second end of said brace member having an external thread;

(b) a first jaw secured on at least one of said second end of said brace member and said externally threaded portion and extending at angle therefrom;

(c) a second jaw, reciprocally movable on said externally threaded portion toward to and away from said first jaw, said second jaw extending at said second angle generally parallel to said first jaw; and (d) a member threadably mounted on said externally threaded portion and reciprocally movable thereon.

20. The support device of claim 18, wherein said first predetermined shape includes a first portion disposed generally horizontally and directly abuts a top surface of a step during use of said support device and a second portion extending downwardly from one end of said first portion and being inclined relative thereto toward an end being opposite end said one end.

* * * * *